(12) United States Patent
Choi et al.

(10) Patent No.: US 8,850,205 B2
(45) Date of Patent: Sep. 30, 2014

(54) KEY DISTRIBUTION METHOD AND AUTHENTICATION SERVER

(75) Inventors: Hyoung-Kee Choi, Seoul (KR);
Jung-Yoon Kim, Gyeonggi-do (KR);
Do-Hyun Kwon, Seoul (KR);
Eun-Young Lee, Chungcheongnam-do (KR); In-Hwan Kim, Gyeonggi-do (KR); Se-Hwa Song, Seoul (KR)

(73) Assignee: Sungyunkwan University Foundation for Corporate Collaboration, Gyeonggi-Do (KR)

( * ) Notice: Subject to any disclaimer, the term of this patent is extended or adjusted under 35 U.S.C. 154(b) by 1388 days.

(21) Appl. No.: 12/325,958

(22) Filed: Dec. 1, 2008

(65) Prior Publication Data

US 2009/0214043 A1    Aug. 27, 2009

(30) Foreign Application Priority Data

Feb. 22, 2008 (KR) ........................ 10-2008-0016283

(51) Int. Cl.
*H04L 9/32* (2006.01)
*H04L 29/06* (2006.01)
*H04W 12/04* (2009.01)
*H04L 9/08* (2006.01)

(52) U.S. Cl.
CPC ............ *H04L 9/0833* (2013.01); *H04L 2209/80* (2013.01); *H04L 9/0869* (2013.01)
USPC ............ 713/171; 380/270; 713/168; 713/150

(58) Field of Classification Search
CPC ............ G06F 21/10; G06F 2221/2107; H04L 63/0428; H04L 2209/80; H04L 63/08; H04W 12/06
USPC .................................................. 380/277, 279
See application file for complete search history.

(56) References Cited

U.S. PATENT DOCUMENTS 6,813,357 B1 *  11/2004  Matsuzaki et al. ............ 380/279
6,853,729 B1 *   2/2005  Mizikovsky .................. 380/249
(Continued)

FOREIGN PATENT DOCUMENTS

KR    10-2006-0097572       9/2006

OTHER PUBLICATIONS

Raylin Tso; Xun Yi; Okamoto, E.; , "ID-Based Key Agreement for Dynamic Peer Groups in Mobile Computing Environments," Asia-Pacific Service Computing Conference, The 2nd IEEE , vol., No., pp. 103-110, Dec. 11-14, 2007 doi: 10.1109/APSCC.2007.42 URL: http://ieeexplore.ieee.org/stamp/stamp.jsp?tp=&arnumber=4414448&isnumber=4414426.*

(Continued)

*Primary Examiner* — Saleh Najjar
*Assistant Examiner* — Feliciano Mejia
(74) *Attorney, Agent, or Firm* — James P. Muraff; Neal, Gerber & Eisenberg LLP

(57) ABSTRACT

A method of and an authentication server for distributing a key are disclosed. According to an embodiment of the present invention, the method of distributing a key, which is distributed by an authentication server connected with wireless terminals through a communication network, for encrypting and decrypting data in accordance with providing a service can include: obtaining characteristic information by decrypting encrypted characteristic information that has been received from each of n number of wireless terminals; generating a random key; generating a group key used for encrypting and decrypting data in accordance with providing a service; and generating a distribution key by using the random key, the group key and the characteristic information, and transmitting the distribution key to each wireless terminal.

20 Claims, 4 Drawing Sheets

(56) References Cited

U.S. PATENT DOCUMENTS

| | | | |
|---|---|---|---|
| 7,317,798 B2 * | 1/2008 | Saito | 380/277 |
| 7,496,203 B2 * | 2/2009 | Choi et al. | 380/263 |
| 7,933,414 B2 * | 4/2011 | Bauchot et al. | 380/279 |

OTHER PUBLICATIONS

Office Action dated Jan. 27, 2010 for Korean Patent Application 10-2008-0016283.

* cited by examiner

KEY DISTRIBUTION METHOD AND AUTHENTICATION SERVER

CROSS-REFERENCE TO RELATED APPLICATIONS

This application claims the benefit of Korean Patent Application No. 10-2008-0016283, filed with the Korean Intellectual Property Office on Feb. 22, 2008, the disclosure of which is incorporated herein by reference in its entirety.

TECHNICAL FIELD

The present invention relates to generating a group key, more particularly to a method of and a server for key distribution that is capable of generating and distributing the group key by use of four fundamental rules of arithmetic only.

BACKGROUND

Recently, with remarkable development of an information communication technology, the number of users who make use of a wireless communication is now rapidly increasing. However, despite much popularity of the wireless communication, the wireless communication is seriously exposed to inevitable attacks in a wireless environment.

That is, information leakage in the information communication technology due to an authorized information exposure or operation is explosively increasing demands for a security mechanism such as cryptography and the like. Particularly, in the multi-channel age of digital broadcasting using satellites, subscribers thereof can receive an individual specialized channel service. Whereas broadcasting providers allow only a person who pays a reasonable receiving fee to watch the TV program by applying the subscriber concept to the TV broadcasting in the broadcasting service management depending on only advertisement rates in existing terrestrial TV broadcasting, and also allow specialized broadcasting providers to produce specialized broadcasting programs, so that they come to be able to provide services of various functions.

A system which can satisfy such a conditional access service corresponds to a conditional access system (CAS). The conditional access system enables only a subscriber of a receiving side, who is authorized to receive, to descramble a signal scrambled by a transmitter and to watch the TV programs.

However, whenever there are service requests from the client, since such a conditional access system encrypts a group key by means of a private key of a client for the purpose of the group key update by a server, and performs a unicast transmission of the group key to all of the clients, unnecessary delay occurs.

SUMMARY OF THE INVENTION

The present invention provides a key distribution method and an authentication server capable of generating and distributing a key for encrypting and decrypting data through a simple four fundamental rules of arithmetic in accordance with services being provided by a wireless terminal.

Also, the present invention provides a key distribution method and an authentication server capable of reducing the time delay for a key distribution in accordance with each wireless terminal connection.

Also, the present invention provides a key distribution method and an authentication server capable of allowing each wireless terminal to obtain a key by once performing a division operation.

An aspect of the present invention features a method for an authentication server, which is connected with wireless terminals through a communication network, to generate and distribute a key for encrypting and decrypting data in accordance with providing a service.

An embodiment of the present invention provides a method of distributing a key for encrypting and decrypting data in accordance with providing a service. The key can be distributed by an authentication server connected with wireless terminals through a communication network. The method can include: obtaining characteristic information by decrypting encrypted characteristic information, which has been received from each of n number of wireless terminals; generating a random key; generating a group key configured to be used for encrypting and decrypting data in accordance with providing a service; and generating a distribution key by using the random key, the group key and the characteristic information, and transmitting the distribution key to each wireless terminal.

The group key can be generated with a value less than a smallest value among the random key and the characteristic information.

The encrypted characteristic information can be encrypted with a private key of each wireless terminal, and the characteristic information can be obtained by decrypting the encrypted characteristic information through the use of a private key of each wireless terminal.

The random key can be generated whenever a new wireless terminal is connected to the authentication server or a connected wireless terminal is disconnected from the authentication server.

The generating of the distribution key by using the random key, the group key and the characteristic information can include: computing a temporary value by multiplying the random key and the characteristic information; and generating the distribution key by adding the temporary value to the group key.

The method can also include: obtaining characteristic information of the new wireless terminal by receiving and decrypting the encrypted characteristic information from the new wireless terminal in accordance with the connection of the new wireless terminal; regenerating a random key; recomputing a temporary value by use of the regenerated random key and the characteristic information of the new wireless terminal; and regenerating a distribution key by adding the recomputed temporary value to the group key, and transmitting the regenerated distribution key to each wireless terminal.

The regenerated distribution key is computed according to equation.

$$W = \frac{T \times R' \times P_{n+1}}{R} + GK,$$

whereas T represents a temporary value computed prior to a request for connection of the new wireless terminal; R' represents the regenerated random key; $P_{n+1}$ represents characteristic information of the new wireless terminal; R represents a random key generated prior to a request for connection of the new wireless terminal; and GK represents the group key.

The method can also include: regenerating a random key if at least one of the connected wireless terminals is disconnected from the authentication server; and regenerating a distribution key by use of the regenerated random key and the characteristic information of the disconnected wireless terminal, and transmitting the regenerated distribution key to each wireless terminal.

The regenerated distribution key can be computed according to equation $$W = \frac{T \times R'}{R \times P_1} + GK,$$

whereas T represents a temporary value computed prior to disconnection of the wireless terminal; R' represents the regenerated random key; $P_i$ represents characteristic information of the disconnected wireless terminal; R represents a random key generated prior to a request for connection of the new wireless terminal; and GK represents the group key.

The wireless terminal can obtain the group key by performing a modulo operation on the distribution key by the characteristic information. The characteristic information can be a random number of a-bits ("a" being a natural number) generated by the wireless terminal. The wireless terminal subtracts the group key from the distribution key, and then can update a quotient from a division operation to a private key.

Another embodiment of the present invention provides a recording medium that tangibly embodies a program of instructions executable by a digital processing apparatus for executing a method of generating and distributing a key for encrypting and decrypting data in accordance with providing a service. The program, which is readable by the digital processing apparatus, can perform: obtaining characteristic information by decrypting encrypted characteristic information received from each of n number of wireless terminals; generating a random key; generating a group key configured to be used for encrypting and decrypting data in accordance with providing a service; and generating a distribution key by using the random key, the group key and the characteristic information, and transmitting the distribution key to each wireless terminal.

Another aspect of the present invention features an authentication server which is connected with wireless terminals through the communication network and distributes a key for encrypting and decrypting data in accordance with providing a service by a wireless terminal.

The authentication server in accordance with an embodiment of the present invention can include: a communication unit configured to receive encrypted characteristic information from each of the wireless terminals; a decryption module configured to decrypt the encrypted characteristic information and obtain each characteristic information; and a generator generating a random key and a group key, and generating a distribution key by use of the generated random key, the group key and the characteristic information. The distribution key can be transmitted to each wireless terminal through the communication unit.

The group key can be generated with a value less than a smallest value among the random key and the characteristic information.

The decryption module can decrypt the encrypted characteristic information by using a private key shared with each wireless terminal and obtain the characteristic information.

The random key can be regenerated whenever a new wireless terminal is connected to the authentication server or a connected wireless terminal is disconnected from the authentication server.

The generator can compute a temporary value by multiplying the random key and the characteristic information, and generate the distribution key by adding the group key to the temporary value.

The wireless terminal can obtain the group key by performing a modulo operation on the distribution key by the characteristic information, and then uses the group key as a session key for providing a service.

A better understanding of the objects, advantages, features, properties and relationships of the invention will be obtained from the following detailed description and accompanying drawings which set forth at least one illustrative embodiment and which are indicative of the various ways in which the principles of the invention may be employed.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. In the following description of the present invention, the detailed description of known technologies incorporated herein will be omitted when it may make the subject matter unclear.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, embodiments of the present invention will be described in detail with reference to the accompanying drawings.

First, a conventional method of distributing a key for encrypting and decrypting data according to a service being provided will be briefly described with reference to FIG. 1 for the sake of convenience of understanding and description of the present invention.

Figure 1:
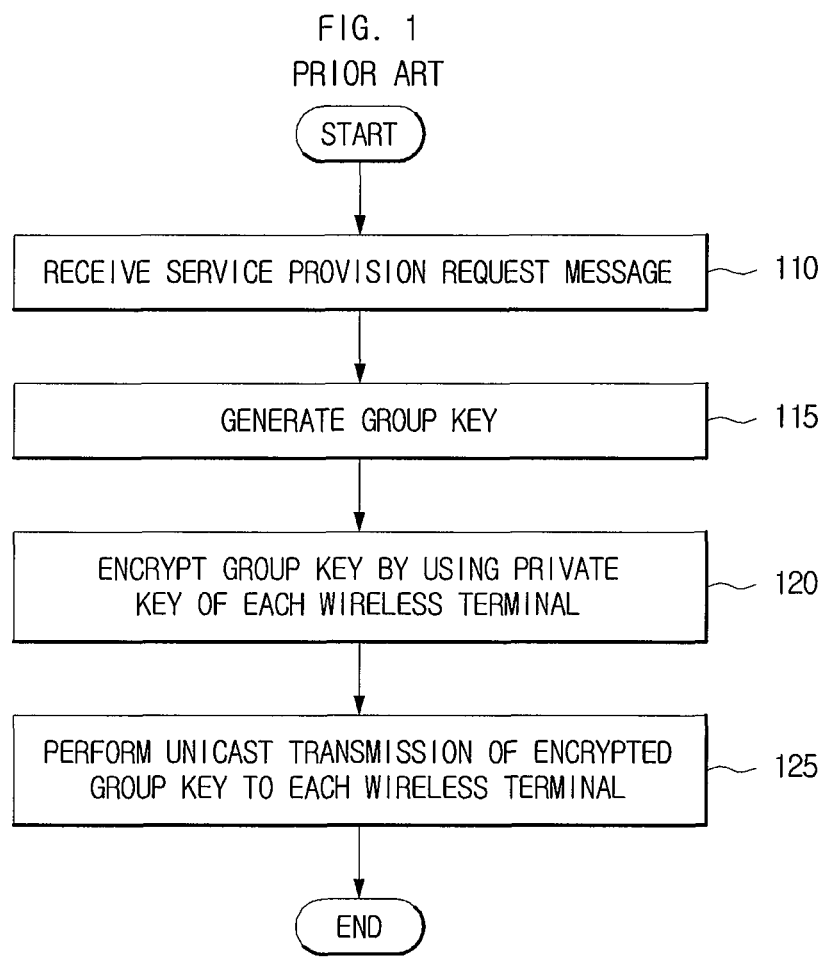
FIG. 1 is a flowchart showing a process of generating and distributing a key from a conventional authentication server.

FIG. 1 is a flowchart showing a process of generating and distributing a key from a conventional authentication server. Hereinafter, on the assuming that the $n^{th}$ wireless terminal are connected with an authentication server in order to use the service of the server in a state where n−1 number of wireless terminals are connecting to the authentication server, a method of subsequently distributing a key will be described. Here, n is a natural number more than 1.

In step 110, the authentication server receives a service provision request message from the $n^{th}$ wireless terminal.

In step 115, the authentication server randomly generates a group key (GK) of k bits. Here, k is a natural number. The size of the corresponding k (that is, the number of bits) can be randomly changed. The larger the size of k is, the higher the security strength is and the longer the time taken for encrypting and decrypting is. Thus, the size of k can be properly determined in consideration of the security strength and a time taken for encrypting and decrypting. Whenever each wireless terminal requests providing a service, the authentication server generates and encrypts a group key, and then performs a unicast transmission of the group key to each wireless terminal.

In step 120, the authentication server encrypts the generated group key (GK) by using the private key (PK) of each wireless terminal. Here, in the following description, it is assumed that the authentication server and the wireless terminals share a private key respectively.

For example, the authentication server encrypts a group key by using the private key of a first wireless terminal and generates an encrypted group key (for the sake of convenience of understanding and description, hereinafter, referred to as "a first encrypted group key"). Then, the authentication server encrypts a group key by using the private key of a second wireless terminal and generates an encrypted group key (for the sake of convenience of understanding and description, hereinafter, referred to as "a second encrypted group key"). In this manner, the authentication server encrypts a group key by using the private key of the $n^{th}$ wireless terminal and generates an encrypted group key (for the sake of convenience of understanding and description, hereinafter, referred to as "the $n^{th}$ encrypted group key").

In step 125, the authentication server performs a unicast transmission of the encrypted group key to the wireless terminals respectively.

For example, the authentication server can transmit the first encrypted group key, the second encrypted group key and the $n^{th}$ encrypted group key to the first wireless terminal, the second wireless terminal and the $n^{th}$ wireless terminal respectively.

Under the state mentioned above, when an $(n+1)^{th}$ wireless terminal is connected to the authentication server, the authentication server encrypts the group key by means of private keys of all of the wireless terminals connected with the corresponding authentication server, and then performs a unicast transmission of the group key to all the wireless terminals respectively.

Additionally, when a wireless terminal is disconnected from the authentication server, the authentication server encrypts the group key by means of the private keys of the connected wireless terminals excluding the disconnected wireless terminal, and then performs a unicast transmission of the group key to each of the wireless terminals.

As such, the conventional authentication server encrypts the group key by means of the private keys of all of the connected wireless terminals, and then performs a unicast transmission of the group key in accordance with whether any wireless terminal is connected to or disconnected from the authentication server, so that unnecessary delay occurs. In a real-time broadcasting service such as a mobile broadcasting, an IP broadcasting and so on, the unnecessary delay is directly related to service quality and is raised as a very serious problem.

Hereinafter, a method of generating and distributing a key only by means of a four fundamental rules of arithmetic according to the present invention will be described with reference to related drawings. That is, the present invention has an advantage of reducing an unnecessary time delay by generating a key only by a four fundamental rules of arithmetic without complicated encrypting process and by transmitting the key to each of the wireless terminals. This can be clearly understood through the following detailed description.

Figure 2:
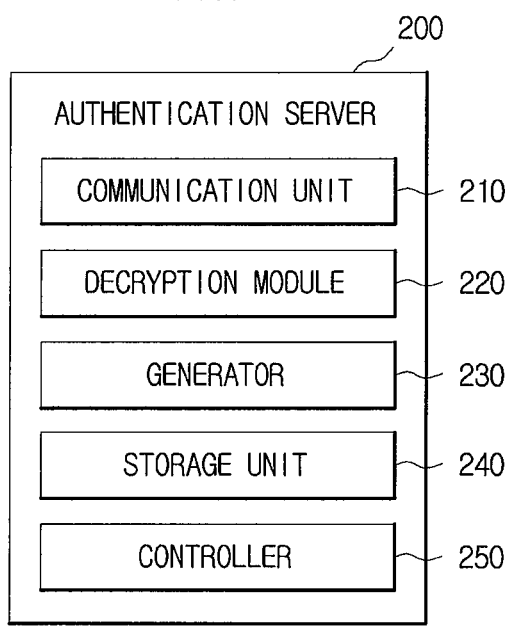
FIG. 2 is a block diagram showing internal configuration components of an authentication server distributing a key according to an embodiment of the present invention.

FIG. 2 is a block diagram showing internal configuration components of an authentication server distributing a key according to an embodiment of the present invention. In the present invention, it is assumed that each wireless terminal and an authentication server 200 share a private key (PK) respectively. Hereinafter, in accordance with connection state changes of certain wireless terminals to an authentication server (for example, when certain wireless terminals are connected to the authentication server 200 in order to request a key to be provided for encrypting and/or decrypting data from a new wireless terminal, when one of the wireless terminals already connected to the authentication server is disconnected, and the like), the authentication server generates (or computes) a group key and transmits the group key to each of the wireless terminals. Subsequently, each wireless terminal obtains the group key and uses the group key for encrypting data to be transmitted and received to/from the authentication server 200 or for decrypting data received from the authentication server 200. Besides, the wireless terminal obtains a session key by using a distribution key received from the authentication server 200, and then uses the session key as a private key for connecting to or disconnecting from the authentication server 200. This can be more clearly understood with the following description.

In FIG. 2, an authentication server 200 according to the present invention includes a communication unit 210, a decryption module 220, a generator 230, a storage unit 240 and a controller 250.

The communication unit 210 is connected with each of wireless terminals through a communication network and performs a function of transmitting and receiving data.

For example, the communication unit 210 is capable of receiving encrypted characteristic information from each of the wireless terminals. The communication unit 210 is also capable of transmitting a distribution key to each of the wireless terminals under the control of the controller 250.

When each wireless terminal is connected to the authentication server 200 in order to use a service, each wireless terminal transmits characteristic information encrypted with its own private key to the authentication server 200. Here, the characteristic information may be a random number of a-bits ("a" being a natural number) generated by each wireless terminal. The numbers of bits of the characteristic information of the wireless terminals may be different from one another.

The decryption module 220 decrypts the encrypted characteristic information under the control of the controller 250, and then obtains and stores the characteristic information.

For example, it is assumed that a new wireless terminal is connected to the authentication server 200. In this case, the new wireless terminal transmits characteristic information encrypted with its own private key to the corresponding authentication server 200. Here, it is assumed that the private key of the new wireless terminal is shared with the authentication server 200 as described above.

The authentication server 200 can obtain the characteristic information of the corresponding new wireless terminal by decrypting the received and encrypted characteristic information through use of the shared private key (a private key of the new wireless terminal).

The generator 230 generates a random key and a group key in accordance with connection state changes of the wireless terminals. The generator 230 generates a distribution key by means of the generated random key, the group key and the characteristic information of the wireless terminals and transmits the distribution key to each wireless terminal. Here, the connection state change represents either the new wireless terminal is connected to the corresponding authentication server 200 or at least one of the connected wireless terminals is disconnected from the authentication server. The group key is used for encrypting and decrypting data to be transmitted/received to/from the authentication server 200 such that the each wireless terminal uses a service. In other words, after transmitting the group key, the authentication server 200 encrypts data according to the service being provided, by means of the group key and transmits the group key to each wireless terminal. Therefore, each wireless terminal obtains the group key through use of the distribution key received from the authentication server 200, and then can decrypt the data received from the authentication server 200 by using the group key in accordance with a service being provided.

For instance, whenever the new wireless terminal is connected to the authentication server, the generator 230 is capable of generating a distribution key including the group key and transmitting the distribution key to each wireless terminal under the control of the controller 250. Whenever at least one of the connected wireless terminals is disconnected from the authentication server, the generator 230 is also capable of regenerating a distribution key including the group key and transmitting the distribution key to each wireless terminal under the control of the controller 250.

As such, whenever the connection state of the wireless terminals connected with the corresponding authentication server 200 changes, the generator 230 generates a group key shared with a wireless terminal connected to the authentication server 200 and can transmit the group key to each wireless terminal.

For example, when the connection states of the wireless terminals are judged to be changed under the control of the controller 250, the generator 230 generates a random key of b bits ("b" being a natural number). The generator 230 computes a temporary value by multiplying the random key by the characteristic information of the wireless terminals that are at this point being connected to or requested to be connected to the authentication server. The generator 230 generates a group key having both the characteristic information of the wireless terminals that are being connected to or requested to be connected to the authentication server and a value less than that of the random key. Subsequently, the generator 230 can generate (or compute) a distribution key by adding the generated group key to the temporary value.

For example, the generator 230 can generate (or compute) the distribution key by means of the following equation (1).

$$\text{distribution key} = (R \times P_1 \times P_2 \times \ldots \times P_n) + GK \quad (1),$$

whereas "R" represents a random key; $P_1$ to $P_n$ represent the characteristic information of each of the wireless terminals connected to the authentication server; and GK represents a group key.

Therefore, each wireless terminal which has received the distribution key can obtain a group key by performing a modulo operation on the received distribution key by means of the characteristic information of the wireless terminal. The obtained group key can be used as a session key when the wireless terminal is connected to the authentication server for the use of service.

Each wireless terminal can obtain a group key by using the following equation (2).

$$\text{group key} = \text{distribution key} \bmod P_i \quad (2),$$

whereas $P_i$ represents characteristic information of each of the wireless terminal.

In addition, each wireless terminal divides a distribution key value minus a group key value by the characteristic information, and computes a quotient. The computed quotient can be used as a session key (a private key). Each wireless terminal substitutes the existing private key with the obtained session key, and can utilize the session key as a new private key. Each wireless terminal can also make use of the obtained session key as a private key for transmitting the information about a session such as the extension of the session or transmission of a session end message.

The storage unit 240 stores the characteristic information and the private keys of the connected wireless terminals, various data about connection states of the connected wireless terminals (e.g., a list of the connected wireless terminals, a list of the disconnected wireless terminals), the generated group key and distribution key, etc. The storage unit 240 also stores an algorithm for operating the authentication server 200 according to the present invention.

The controller 250 performs a function of controlling internal configuration components (for example, the communication unit 210, the decryption module 220, the generator 230, and the storage unit 240 and so on) of the authentication server 200 according to the present invention.

Either when a new wireless terminal is connected to the corresponding authentication server 200 or at least one of the connected wireless terminals is disconnected from the authentication server 200, the controller 250 can generate a key redistribution control command and can output to the generator 230. Here, the key redistribution control command may include information of wireless terminals of which connection states have changed.

Figure 3:
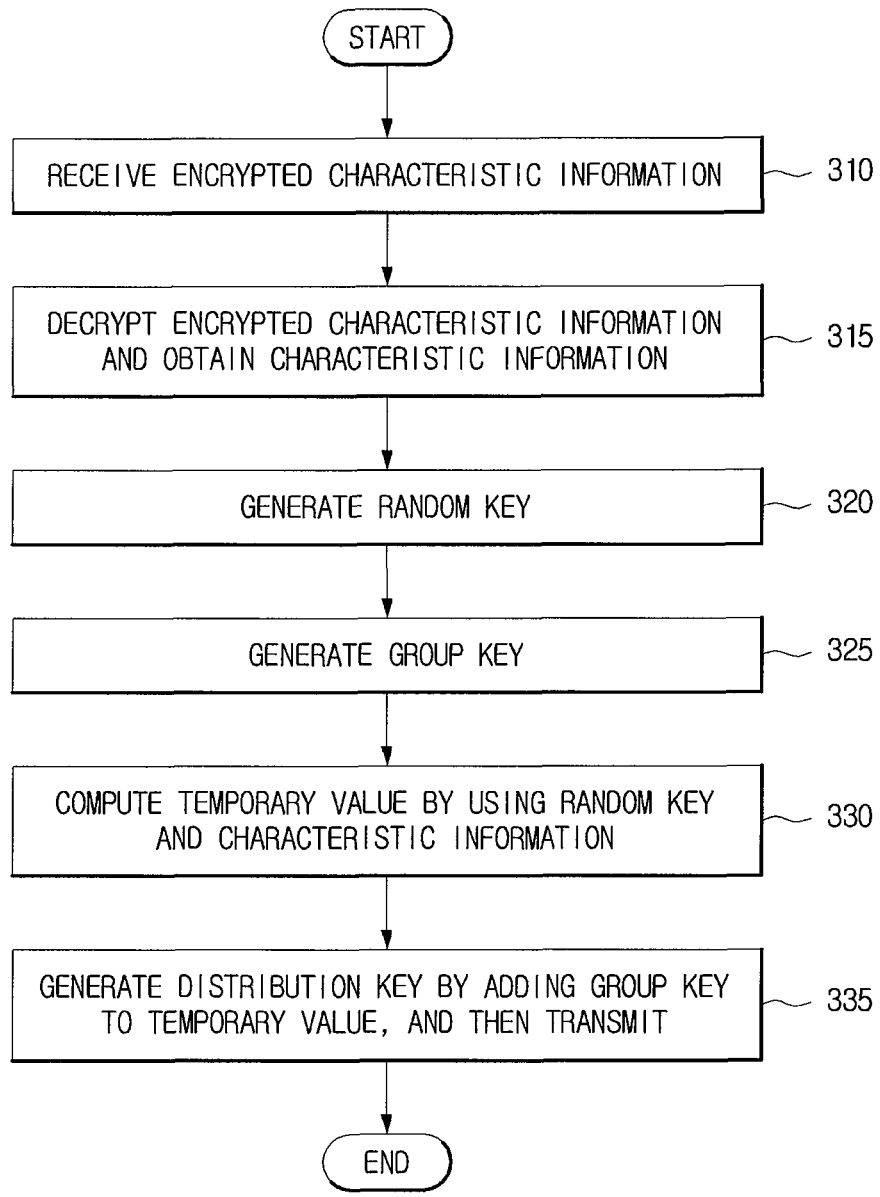
FIG. 3 is a flowchart showing a method for an authentication server according to an embodiment of the present invention to generate and distribute a key.

FIG. 3 is a flowchart showing a method for an authentication server according to an embodiment of the present invention to generate and distribute a key. Hereinafter, it is assumed that n number of wireless terminals are connected to the authentication server. A process of generating and distributing a group key will be described. Accordingly, while the following steps to be described below are respectively performed by the internal configuration components of the authentication server 200, the steps will be described by commonly designating the internal configuration components as an authentication server In step 310, the authentication server 200 receives characteristic information encrypted by n number of the wireless terminals. As described above, the authentication server 200 shares private keys with the n number of the wireless terminals. Here, the encrypted characteristic information is encrypted with the private key of each wireless terminal. The encrypted characteristic information includes the private key and the characteristic information. Therefore, the authentication server 200 decrypts the characteristic information encrypted with the private key of each wireless terminal and can authenticate each wireless terminal through a comparison of the obtained private key with the shared private key.

In step 315, the authentication server 200 decrypts the encrypted characteristic information through use of the stored private key of each wireless terminal and then obtains the characteristic information of each wireless terminal.

In step 320, the authentication server 200 generates a random key (R) of b bits ("b" being a natural number). Here, the random key is used for preventing another wireless terminal (e.g., an unauthenticated wireless terminal) from obtaining a group key by forging the characteristic information.

In step 325, the authentication server 200 generates a group key having a value less than that of the generated random key (R) and that of the obtained characteristic information. Here, the group key is used for encrypting and decrypting data at the time of transmitting and receiving the data in accordance with a service provided among the wireless terminals.

In step 330, the authentication server 200 computes a temporary value by multiplying all of the generated random keys (R) and the obtained characteristic information.

For example, the temporary value can be computed by using the following equation (3).

$$T = R \times P_1 \times P_2 \times \ldots \times P_n \quad (3),$$

whereas R represents a random key; and $P_1$ to $P_n$ represent the obtained characteristic information.

In step 335, the authentication server 200 generates a distribution key by adding the temporary value to the group key, and transmits to each wireless terminal.

In such a state, when a new wireless terminal is connected to the authentication server 200, the authentication server 200 regenerates a random key (R'). As a result, the authentication server 200 computes a temporary value (T') reflecting the regenerated random key (R'), and regenerate a distribution key by using the corresponding temporary value and the group key, and then can transmit to each wireless terminal.

For example, the authentication server 200 can compute a temporary value by using the following equation (4) when a new wireless terminal is connected to the authentication server 200.

$$T' \frac{T \times R' \times P_{n+1}}{R}, \quad (4)$$

whereas T represents a temporary value computed at prior point of time; R' represents a random key regenerated at this point of time; R represents a random key generated at prior point of time; and $P_{n+1}$ represents characteristic information of the new wireless terminal.

For another example, it is assumed that in a state where n number of wireless terminals are connected to the authentication server, one of the wireless terminals is disconnected from the authentication server. In this case, the authentication server 200 regenerates a random key and computes a temporary value again. For instance, the temporary value can be computed again through use of the following equation (5).

$$T' \frac{T \times R'}{R \times P_i} \quad (5)$$

whereas T represents a temporary value computed at prior point of time; R' represents a random key regenerated at this point of time; R represents a random key generated at prior point of time; and Pi represents characteristic information of the disconnected wireless terminal.

Figure 4:
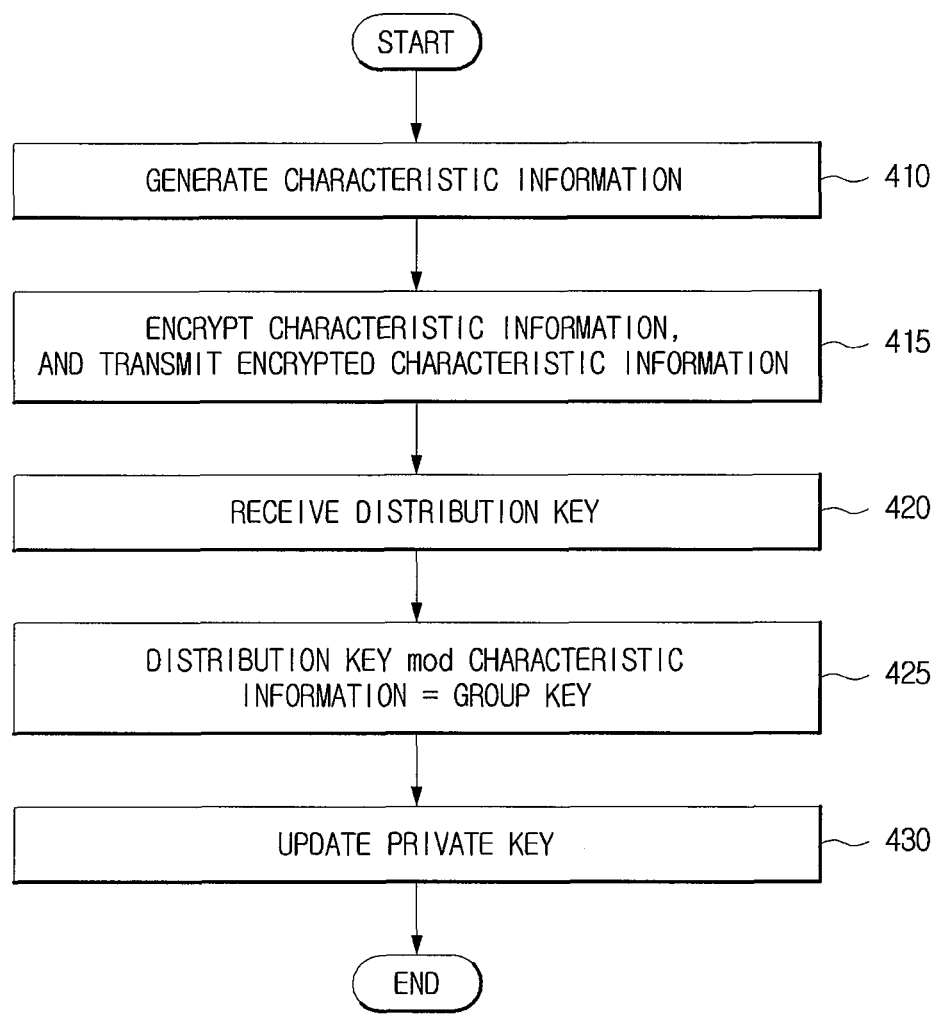
FIG. 4 is a flowchart showing a method of obtaining a key by a wireless terminal according to an embodiment of the present invention.

FIG. 4 is a flowchart showing a method of obtaining a key by a wireless terminal according to an embodiment of the present invention. Hereinafter, described will be a process of obtaining a private key (or a session key) to be updated and a group key for encrypting and/or decrypting data after each wireless terminal receives a distribution key from the authentication server 200. Besides, it is also assumed that each wireless terminal stores its own characteristic information generated by the each corresponding wireless terminal.

In step 410, a wireless terminal generates own characteristic information. Here, the characteristic information may have a random value of b bits ("b" being a natural number).

In step 415, the wireless terminal encrypts the characteristic information and a private key by means of the private key, and transmits the encrypted characteristic information to the authentication server 200.

In step 420, the wireless terminal receives a distribution key from the authentication server 200.

In step 425, the wireless terminal performs a modulo operation on the received distribution key by the characteristic information and then obtains a group key. The wireless terminal can encrypt and decrypt data transmitted and received to/from the authentication server 200 by making use of the group key in order to use a service.

As described above, the wireless terminal is capable of obtaining the group key by using the equation (2).

In step 430, the wireless terminal obtains a private key by using the distribution key, the group key and the characteristic information, and substitutes the existing private key with the private key.

For example, the wireless terminal can set a quotient obtained from a division operation of the distribution key minus the group key as a private key (or a session key).

Additionally, it shall be evident that a program of instructions for performing methods mentioned above may be tangibly embodied.

While the present invention has been described with reference to exemplary embodiments thereof, it will be understood by those skilled in the art that various changes and modification in forms and details may be made without departing from the spirit and scope of the present invention as defined by the appended claims.

What is claimed is:

1. A method of generating and distributing a key for encrypting and decrypting data in accordance with providing a service, the key being generated and distributed by an authentication server connected with wireless terminals through a communication network, the method comprising:
   obtaining characteristic information by decrypting encrypted characteristic information, the encrypted characteristic information having been received from each of n number of wireless terminals;
   generating a random key prior to a request for connection of a new wireless terminal to the authentication server;
   generating a group key configured to be used for encrypting and decrypting data in accordance with providing the service;
   generating using the authentication server a distribution key by using the random key, the group key and the characteristic information;
   transmitting the distribution key to each wireless terminal;
   upon connection of the new wireless terminal to the authentication server, obtaining characteristic information of the new wireless terminal by receiving and decrypting the encrypted characteristic information from the new wireless terminal;
   regenerating a random key;

regenerating a distribution key using the regenerated random key, the characteristic information of the new wireless terminal, and the group key; and transmitting the regenerated distribution key to each wireless terminal.

2. The method of claim 1, wherein the group key is generated with a value less than a smallest value among the random key and the characteristic information.

3. The method of claim 1, wherein the encrypted characteristic information is encrypted with a private key of each wireless terminal, and the characteristic information is obtained by decrypting the encrypted characteristic information through the use of a private key of each wireless terminal.

4. The method of claim 1, wherein the step of generating a distribution key by using the random key, the group key and the characteristic information comprises:

computing a temporary value by multiplying the random key and the characteristic information; and generating the distribution key by adding the temporary value to the group key, wherein the temporary value is computed prior to the request for connection of the new wireless terminal.

5. The method of claim 4, wherein the step of regenerating a distribution key using the regenerated random key, the characteristic information of the new wireless terminal, and the group key comprises:

recomputing a temporary value by use of the regenerated random key and the characteristic information of the new wireless terminal; and regenerating the distribution key by adding the recomputed temporary value to the group key.

6. The method of claim 5, wherein the regenerated distribution key is computed according to equation:

$$W = \frac{T \times R' \times P_{n+1}}{R} + GK,$$

whereas T represents the temporary value computed prior to the request for connection of the new wireless terminal; R' represents the regenerated random key; $P_{n+1}$ represents characteristic information of the new wireless terminal; R represents the random key generated prior to the request for connection of the new terminal; and GK represents the group key.

7. The method of claim 1, wherein the wireless terminal obtains the group key by performing a modulo operation on the distribution key by the characteristic information and, wherein the characteristic information is a random number of a-bits ("a" being a natural number) generated by the wireless terminal.

8. A method of generating and distributing a key for encrypting and decrypting data in accordance with providing a service, the key being generated and distributed by an authentication server connected with wireless terminals through a communication network, the method comprising:

obtaining characteristic information by decrypting encrypted characteristic information, the encrypted characteristic information having been received from each of n number of wireless terminals;

generating a random key prior to disconnection of a connected wireless terminal from the authentication server;

generating a group key configured to be used for encrypting and decrypting data in accordance with providing the service;

generating using the authentication server a distribution key by using the random key, the group key and the characteristic information;

transmitting the distribution key to each wireless terminal;

upon disconnection of the connected wireless terminal from the authentication server, regenerating a random key;

regenerating a distribution key using the regenerated random key and the characteristic information of the disconnected wireless terminal; and transmitting the regenerated distribution key to each wireless terminal.

9. The method of claim 7, wherein the wireless terminal subtracts the group key from the distribution key, and then updates a quotient from a division operation to a private key.

10. The method of claim 8, wherein generating a distribution key using the random key, the group key and the characteristic information comprises:

computing a temporary value by multiplying the random key and the characteristic information; and generating the distribution key by adding the temporary value to the group key, wherein the temporary value computed prior to disconnection of the connected wireless terminal.

11. The method of claim 10, wherein regenerating a distribution key using the regenerated random key, the characteristic information of the new wireless terminal, and the group key comprises:

recomputing a temporary value by use of the regenerated random key and the characteristic information of the new wireless terminal; and regenerating the distribution key by adding the recomputed temporary value to the group key.

12. The method of claim 11, wherein the regenerated distribution key is computed according to equation $$W = \frac{T \times R'}{R \times P_i} + GK,$$

whereas T represents the temporary value computed prior to disconnection of the connected wireless terminal; R' represents the regenerated random key; $P_i$ represents characteristic information of the disconnected wireless terminal; R represents the random key generated prior to disconnection of the connected wireless terminal; and GK represents the group key.

13. An authentication server generating and distributing a key for encrypting and decrypting data in accordance with providing a service, the authentication server comprising a processor and being connected with wireless terminals through a communication network, the authentication server comprising:

a network communication computer hardware unit configured to receive encrypted characteristic information from each of the wireless terminals;

a decrypting computer program for execution on the processor, the decrypting computer program configured to decrypt the encrypted characteristic information and obtain each characteristic information; and a generating computer program for execution on the processor, the generating computer program configured to generate a random key and a group key, and to generate a distribution key by use of the generated random key, the group key and the characteristic information, wherein the random key is generated prior to a request for connection of a new wireless terminal to the authentication server, wherein the distribution key is transmitted to each wireless terminal through the network communication hardware, and wherein upon connection of the new wireless terminal to the authentication server, the network communication hardware receives encrypted characteristic information from the new wireless terminal; the decrypting computer program decrypts the encrypted characteristic information of the new wireless terminal to obtain the characteristic information of the new wireless terminal; the generating computer program regenerates a random key, and regenerates a distribution key using the regenerated random key, the characteristic information of the new wireless terminal, and the group key; and the network communication hardware transmits the regenerated distribution key to each wireless terminal.

14. The authentication server of claim 13, wherein the group key is generated with a value less than a smallest value among the random key and the characteristic information.

15. The authentication server of claim 13, wherein the decrypting computer program decrypts the encrypted characteristic information by using a private key shared with each wireless terminal and obtains the characteristic information.

16. The authentication server of claim 13, wherein the generating computer program computes a temporary value by multiplying the random key and the characteristic information, and generates the distribution key by adding the group key to the temporary value.

17. The authentication server of claim 13, wherein the wireless terminal obtains the group key by performing a modulo operation on the distribution key by the characteristic information, and then uses the group key as a session key for providing a service.

18. A non-transitory recording medium tangibly embodying a program of instructions executable by a digital processing apparatus for executing a method of generating and distributing a key for encrypting and decrypting data in accordance with providing a service, the program being readable by the digital processing apparatus, the program configured to:

obtain characteristic information by decrypting encrypted characteristic information received from each of n number of wireless terminals connected to an authentication server;

generate a random key prior to connection of a new wireless terminal to the authentication server;

generate a group key configured to be used for encrypting and decrypting data in accordance with providing a service;

generate a distribution key by using the random key, the group key and the characteristic information;

transmit the distribution key to each wireless terminal;

upon connection of the new wireless terminal to the authentication server, obtain characteristic information of the new wireless terminal by receiving and decrypting the encrypted characteristic information from the new wireless terminal;

regenerate a random key;

regenerate a distribution key using the regenerated random key, the characteristic information of the new wireless terminal, and the group key; and transmit the regenerated distribution key to each wireless terminal.

19. A non-transitory recording medium tangibly embodying a program of instructions executable by a digital processing apparatus for executing a method of generating and distributing a key for encrypting and decrypting data in accordance with providing a service, the program being readable by the digital processing apparatus, the program configured to:

obtain characteristic information by decrypting encrypted characteristic information received from each of n number of wireless terminals connected to an authentication server;

generate a random key prior to disconnection of a connected wireless terminal from the authentication server;

generate a group key configured to be used for encrypting and decrypting data in accordance with providing a service;

generate a distribution key by using the random key, the group key and the characteristic information;

transmit the distribution key to each connected wireless terminal;

upon disconnection of the connected wireless terminal from the authentication server, regenerate a random key;

regenerate a distribution key using the regenerated random key and the characteristic information of the disconnected wireless terminal; and transmit the regenerated distribution key to each wireless terminal.

20. An authentication server generating and distributing a key for encrypting and decrypting data in accordance with providing a service, the authentication server comprising a processor and being connected with wireless terminals through a communication network, the authentication server comprising:

a network communication computer hardware configured to receive encrypted characteristic information from each of the wireless terminals;

a decrypting computer program for execution on the processor, the decrypting computer program configured to decrypt the encrypted characteristic information and obtain each characteristic information; and a generating computer program for execution on the processor, the generating computer program configured to generate a random key and a group key, and to generate a distribution key by use of the generated random key, the group key and the characteristic information, wherein the random key is generated prior to disconnection of a connected wireless terminal from the authentication server;

wherein the distribution key is transmitted to each wireless terminal through the network communication hardware, and wherein upon disconnection of the connected wireless terminal from the authentication server, the generating computer program regenerates a random key, and regenerates a distribution key using the regenerated random key and the characteristic information of the disconnected wireless terminal; and the network communication hardware transmits the regenerated distribution key to each wireless terminal.

* * * * *